(12) United States Patent
Garthwaite (10) Patent No.: US 7,565,499 B1
(45) Date of Patent: Jul. 21, 2009

(54) METHOD AND APPARATUS FOR RECORDING MODIFIED REFERENCE LOCATIONS IN GARBAGE-COLLECTED HEAP MEMORY

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 744 days.

(21) Appl. No.: 11/091,032

(22) Filed: Mar. 28, 2005

(51) Int. Cl.
*G06F 12/00* (2006.01)
(52) U.S. Cl. ...................... 711/159; 707/206
(58) Field of Classification Search ................... 711/159
See application file for complete search history.

(56) References Cited

U.S. PATENT DOCUMENTS

| | | | |
|---|---|---|---|
| 5,920,876 A * | 7/1999 | Ungar et al. ................ 707/206 |
| 6,047,295 A * | 4/2000 | Endicott et al. ............. 707/206 |
| 6,115,782 A * | 9/2000 | Wolczko et al. ............. 711/100 |
| 6,148,310 A | 11/2000 | Azagury et al. |
| 6,173,294 B1 | 1/2001 | Azagury et al. |
| 6,185,581 B1 | 2/2001 | Garthwaite |
| 6,226,653 B1 | 5/2001 | Alpern et al. |
| 6,243,720 B1 | 6/2001 | Munter et al. |
| 6,308,185 B1 | 10/2001 | Grarup et al. |
| 6,363,403 B1 | 3/2002 | Roy et al. |
| 6,381,738 B1 | 4/2002 | Choi et al. |
| 6,424,977 B1 | 7/2002 | Garthwaite |
| 6,453,466 B1 | 9/2002 | Eidt et al. |
| 6,457,019 B1 | 9/2002 | Sexton et al. |
| 6,490,599 B2 | 12/2002 | Kolodner et al. |
| 6,526,422 B1 * | 2/2003 | Flood et al. ................. 707/206 |
| 6,560,619 B1 * | 5/2003 | Flood et al. ................. 707/206 |
| 6,826,757 B2 | 11/2004 | Steele et al. |
| 6,845,437 B2 * | 1/2005 | Borman et al. .............. 711/173 |
| 6,868,488 B2 | 3/2005 | Garthwaite |
| 2001/0039609 A1 * | 11/2001 | Houldsworth ............... 711/170 |
| 2003/0005027 A1 * | 1/2003 | Borman et al. .............. 709/104 |
| 2004/0003014 A1 | 1/2004 | Nagarajan et al. |
| 2004/0162860 A1 * | 8/2004 | Detlefs ....................... 707/206 |
| 2004/0215914 A1 * | 10/2004 | Dussud ....................... 711/173 |
| 2005/0021576 A1 * | 1/2005 | Barabash et al. ............ 707/206 |

OTHER PUBLICATIONS

Zorn, Benjamin, Barrier Methods for Garbage Collection. Department of Computer Science, University of Colorado at Boulder, CU-CS-494-90, Nov. 1990, pp. 1-37.
Sobalvarro, Patrick, A Lifetime-based Garbage Collector for LISP Systems on General-Purpose Computers, Technical Report 1417, Feb. 1988, pp. 1-59, Cambridge, Massachusetts.

(Continued)

*Primary Examiner*—Pierre-Michel Bataille
*Assistant Examiner*—Ryan Dare
(74) *Attorney, Agent, or Firm*—Osha • Liang LLP (57) ABSTRACT

In a computer system with a garbage-collected heap memory, a cache of modified reference locations is associated with each application thread. The cache comprises a plurality of reference cache entries that are encoded in one of a plurality of ways. Using a write barrier that operates during a store operation, each application thread records modified references in its associated reference cache. Only when an entry must be evicted to make room for new information or when the thread is suspended is further processing of the reference cache required.

22 Claims, 10 Drawing Sheets

OTHER PUBLICATIONS

Wilson, Paul R. and Moher, Thomas G, A "Card-Marking" Scheme for Controlling Intergenerational References in Generation-Based Garbage Collection on Stock Hardware. [Working Paper], pp. 87-92, University of Illinois at Chicago, 1989.
Holze, Urs. A Fast Write Barrier for Generational Garbage Collectors, Presented at the OOPSLA '93 Garbage Collection Workshop, Washington, D.C., Oct. 1993, pp. 1-6.
Wilson, Paul R. Uniprocessor Garbage Collection Techniques. [Submitted to ACM Computing Surveys], 1994, pp. 1-67.
Hudson, Richard L. and Moss, Eliot B., Incremental Collection of Mature Objects, 1992, pp. 1-16.
Appel, "Simple Generational Garbage Collection and Fast Allocation", Software Practice and Experience, 19(2), 1989, 171-183.
Appel, et al., "Real-Time Concurrent Collection on Stock Multiprocessors", ACM SIGPLAN Notices, 1988.
Bacon, et al., "Java without the Coffee Breaks: A nonintrusive Multiprocessor Garbage Collector", SIGPLAN Conference on Programming Language Design and Implementation, Jun. 2001, Snowbird, UT.
Baker, "List Processing in Real Time on a Serial Computer", Communications of the ACM 21, Apr. 1978, 280-294.
Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.
Chilimbi, et al., "Using Generational Garbage Collection to Implement Cache-Conscious Data Placement", International Symposium on Memory Management, Oct. 1998.
Clark, et al., "Compacting Garbage Collection can be Fast and Simple", Software-Practice and Experience, vol. 26, No. 2, Feb. 1996, 177-194.
Courts, "Improving Locality of Reference in a Garbage-Collecting Memory Management System", Communications of the ACM, vol. 31, No. 9, Sep. 1988, 1128-1138.
Grarup, et al., "Incremental Mature Garbage Collection", M.Sc.Thesis @ http://www.daimi.aau.dk/jacobse/Papers, Aug. 1993.
Herlihy, et al., "Lock-Free Garbage Collection for Multiprocessors", ACM SPAA, 1991, 229-236.
Holzle, Urs, "A Fast Write Barrier for Generational Garbage Collectors", Workshop on Garbage Collection in Object Oriented Systems, Oct. 1993.
Hosking, et al., "Remembered Sets Can Also Play Cards", OOPSLA/ECOOP Workshop on Garbage Collection in Object-Oriented Systems, Oct. 1993.
Hosking, et al., "Protection Traps and Alternatives for Memory Management of an Object-Oriented Language", Object Systems Laboratory, Dec. 1-14, 1993, Dept. of Comp. Sci., Amherst, MA.
Hudson, et al., "Incremental Collection of Mature Objects", Proceedings of the Int'l Workshop on Memory Managment, 1992, pp. 1-16, Springer-Verlag.
Hudson, et al., "Adaptive Garbage Collection for Modula-3 and Small Talk", OOPSLA.ECOOP '90 Workshop on Garbage Collection in Object-Oriented Systems, Oct. 27, 1990.
Hudson, et al., "Sapphire: Copying GC Without Stopping the World", Java Grande/ISCOPE, 2001.
Jones and Lins, "Garbage Collection: Algorithms for Automatic Dynamic Memory Management", 1996, 165-179, John Wiley and Sons, NY.
Lieberman, et al., "A Real-Time Garbage Collector Based on the Lifetimes of Objects", Communications of the ACM, 1983, 26(6).
Moon, "Garbage Collection in a Large Lisp System", Conference Record of the 1984 ACM Symposium on LISP and Functional Programming, Aug. 1984, 235-246, Austin, TX.
Nettles, Scott, "Real-Time Replication Garbage Collection", Avionics Lab, Wright Research and Development Center, 1993, PDDI.
Seligmann, et al., "Incremental Mature Garbage Collection, In the European Conference on Object-Oriented Programming", M.Sc. Thesis @ http://www.daimi.aau.dk/jacobse/Papers/, 1995.
Sobalvarro, "A Lifetime-based Garbage Collector for LISP Systems on General-Purpose Computers", Department of Electrical Engineering and Computer Science at MIT, Sep. 1988, AITR-1417.
Stamos, "Static Grouping of Small Objects to Enhance Performance of a Paged Virtual Memory", ACM Transactions on Computer Systems, vol. 2, No. 2, May 1984, 155-180.
Ungar, "Generation Scavenging: A Non-Disruptive High Performance Storage Reclamation Algorithm", ACM SIGPLAN Notices, Apr. 1984, 19(5).
Wilson, "Uniprocessor Garbage Collection Techniques", Technical Report, University of Texas, 1994.
Withington, P.T., "How Real is "Real-Time" GC?", Symbolics, Inc., Oct. 6, 1991, Burlington, MA.
Zorn, Benjamin, "Barrier Methods for Garbage Collection", Dept. of Computer Science, Uni. of Colorado, Nov. 1990, 1-37, Boulder.
Hosking, et al., "A Comparative Performance Evaluation of Write Barrier Implementations", OOPSLA; ACM Conference on Object-Oriented Systems, Languages and Applications, Oct. 1992, V. 27(10), ACM Press, Vancouver, Canada.
Lam, et al., "Object Type Directed Garbage Collection to Improve Locality", Proceedings of the International Workshop on Memory Management, Sep. 1992, 404-425, St. Malo, France.
Pirinen, Pekka, "Barrier Techniques for Incremental Tracing", Harlequin Limited, Date Unknown, 20-25, Cambridge, Great Britain.
Wilson, et al., "Effective Static-Graph Reorganization to Improve Locality in Garbage Collected Systems", Proceedings of ACM SIGPLAN Conference on Programming Language Design and Implementation, Jun. 1991, Canada.
Detlefs, et al., "Concurrent Remembered Set Refinement in Generational Garbage Collection", Proceedings of the USENIX Java VM '02 Conference, Aug. 1-2, 2002, 14 pages, San Francisco, CA, USA.

\* cited by examiner

METHOD AND APPARATUS FOR RECORDING MODIFIED REFERENCE LOCATIONS IN GARBAGE-COLLECTED HEAP MEMORY

BACKGROUND

This invention relates to garbage collectors that scan and summarize heap memory as part of a garbage collection process. In general, memory reclamation may be carried out by a special purpose garbage collection algorithm that locates and reclaims memory which is unused, but has not been explicitly de-allocated. There are many known garbage collection algorithms, including reference counting, mark-sweep, mark-compaction and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996.

An object may be located by a "reference", or a small amount of information that can be used to access the object data structure. Garbage collectors typically examine these references to determine which objects are reachable and, thus, must be maintained and which objects are no longer reachable and, thus, constitute garbage that can be reclaimed. However, when application threads run they can create, delete and modify references. Accordingly, some mechanism must be used to inform the collector of changes made to references by application threads while the collector is examining the references.

Write barriers are one method used to notify garbage collectors of changes in reference values in the heap caused by application threads. Typically, a write barrier intercepts an attempt by an application thread to store a value to memory. The write barrier can then check to determine whether a reference is being modified and, if so, mark the reference as modified, inform the collector of the modification or perform other processing that will later inform the collector that the reference has been modified. Write barriers are discussed in general in the aforementioned book by Jones and Lins.

Write barrier techniques have typically fallen into three categories: (1) hardware barriers and memory protection, (2) card tables, and (3) sequential store buffers (SSBs). Hardware barriers and memory protection schemes use special hardware or the memory protection provided by the virtual memory system to detect memory stores by the application threads.

Card tables are typically used with generational garbage collectors, which have younger generations that are collected frequently and older generations that are collected less frequently. In such systems it is necessary to track references from older generations into younger generations so that the younger generations can be collected without examining every object in the older generations. In a card table technique, the heap memory belonging to the older generations is split into equal-size chunks called "cards." A card table is an array with a one entry per card in the heap. When a reference update occurs, the card containing the updated reference is marked "dirty" by setting its entry in the card table to an appropriate value. Later, during the collection process, only heap memory areas corresponding to dirty cards are scanned.

Sequential store buffers are thread-local buffers that store the addresses of fields into which cross-generational references are stored. The references may be filtered before storing them to eliminate references that are not of interest and to eliminate duplicates in the buffers. An overflow of a buffer is trapped and causes the buffer to be processed and recycled for further use.

Because most collection is driven either by the allocation activity of the application threads or by the collector, if it is performing collections concurrently with the operation of the application threads, one challenge has been how to control how much memory must be scanned and summarized by the collector when it suspends the application threads to perform a collection. The ability to limit the amount of memory that must be scanned is particularly important for space-incremental techniques like the Train algorithm. Some collectors address this problem by limiting the amount of memory the application may mark as dirty, while other collectors have employed concurrent threads to scan modified locations. The card table and sequential store buffer write barrier techniques tend to collapse repeated stores to the same or close reference locations to the same card or buffer. Since only dirty cards or buffers into which field addresses have been stored are scanned, the amount of scanned memory is reduced. However, the use of card tables incurs two costs. First, the number of cards that must be scanned can approach the number of cards comprising the generation with which they are associated; second, all entries of the card table must be examined regardless of which ones are marked as dirty; and, third, when a card is processed, all reference locations in the card must be examined regardless of which ones have been recently modified. As the size of the generation associated with the cards and card table increases both of these costs increase. Sequential store buffers can determine entries to be scanned more exactly, but incur additional processing when a buffer becomes full.

SUMMARY

In accordance with the principles of the present invention, a cache of modified reference locations (called a "reference cache") is associated with each application thread. However, unlike sequential store buffers, this assignment is fixed for the life of the thread: there is no handing off, or recycling, of reference caches. Each entry in the reference cache can be encoded in a number of ways, including a card address, a card-or-reference address, and a partial address/bitmap pair.

The write barrier mechanism then updates this cache. This write barrier shares some of the characteristics of card tables and of sequential store buffers. In particular, like a card table, the inventive write barrier enables an application thread to collapse repeated stores to the same, or close, reference locations. Like the sequential store buffer, the application thread only manipulates thread-local data structures. However, unlike card table techniques, the inventive write barrier can retain more precise information about which parts of memory are modified, and unlike sequential store buffers, the inventive technique makes use of simple memory management schemes that keep most reference processing local to each thread.

The reference cache is managed much like any cache where the level of set associativity, replacement policy, probing function, and victim slots can be chosen. In general, information is stored in the reference cache at a location governed by an index calculated from a modified reference address. If conflicting information for another reference location has already been stored in the reference cache at the location of the index, then the existing information is "evicted" to free the location for the new information. An evicted entry may be processed in several different manners as described below.

One embodiment uses a simple direct-mapped reference cache where entries are indexed simply by extracting bits from the addresses of modified references.

In yet another embodiment, the reference cache is embedded directly in the structure of each application thread. In still another embodiment, a pointer to the reference cache structure is installed in the application thread.

DETAILED DESCRIPTION

Figure 1:
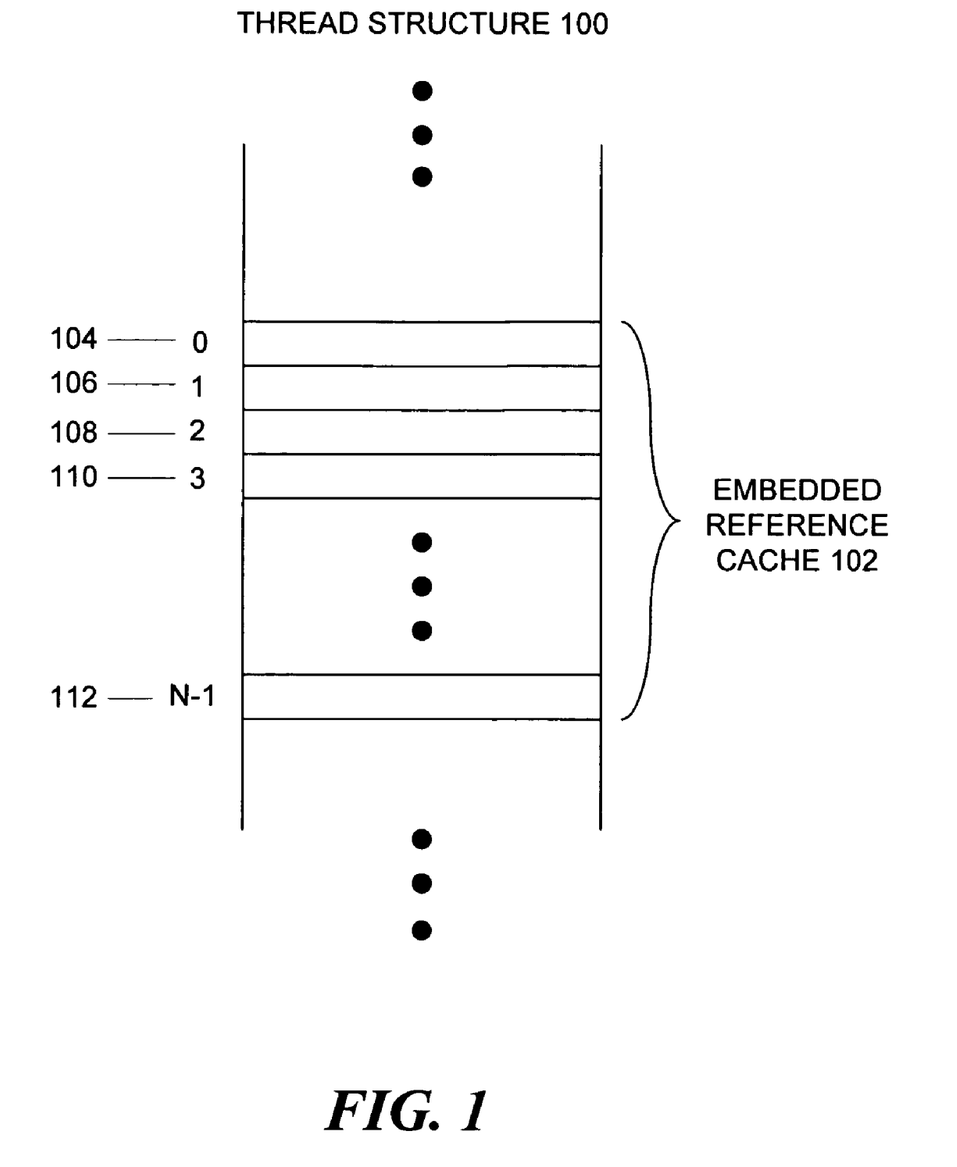
FIG. 1 is a block schematic diagram showing a reference cache which is embedded in the structure of an application thread.

As previously mentioned, a cache of modified reference locations (called a "reference cache") is associated with each application thread. The cache comprises a plurality of reference cache entries. In one embodiment, this association is made by embedding the reference cache entries directly in the thread structure as illustrated in FIG. 1. In particular, the embedded reference cache entries 102 are simply included "in-line" in the thread structure 100. FIG. 1 shows a reference cache with N entries of which entries 104-112 are shown. Using the inventive write barrier technique, an application thread records modified references in its associated reference cache. Only when an entry must be evicted or when the thread is suspended is further processing of the reference cache required.

The number of entries in a reference cache has an impact on the amount of work that the collector must perform for each application thread (assuming that the collector scans un-evicted reference cache entries when the thread is suspended) as well as on the frequency with which entries must be evicted. However, since most applications exhibit a good deal of locality in the memory regions that their threads modify, even reference caches with small numbers of entries perform in a satisfactory manner. For example, experimental studies have shown that reference caches with as few as 64 or 128 entries can significantly increase the ratio of reference cache entry writes to reference cache entry evictions.

The entries in the reference cache can encode the modified reference address in a number of ways. FIGS. 2A-2E shows several basic encodings. In one embodiment shown in FIG. 2A, each reference cache entry holds an address for a card in a card table marking system as described above. In this embodiment, when a reference is modified, rather than marking a card as "dirty" in the card table, as is done in the prior art card table marking technique, the card address is inserted into a reference cache entry in the reference cache to indicate that the card is "dirty." When a reference cache entry is evicted it is processed and when the application thread is suspended and the non-empty entries in its reference cache are examined, each non-empty entry is processed.

Figure 2A:
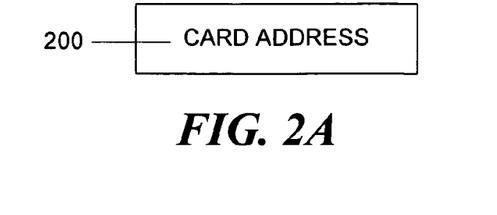
FIG. 2A is a block schematic diagram illustrating encoding of a reference cache entry with a card address.

Processing an entry encoded as a card may involve dirtying the card's entry in a card table if the collector uses a card table to track references. Processing an entry may also take the form of logging the card in a sequential store buffer for subsequent scanning and summarization of references. Alternatively, processing the entry may involve an application thread scanning the objects overlapping the card for references to be summarized for the collector. Further, the choice of how to process the entry may depend on a counter indicating either a global or a per-thread limit on the number of cards allowed to be dirtied but that remain un-summarized at the start of a collection pause. The counter can be maintained as part of processing an entry. Finally, the processing of an entry can be used by application threads to decide when to initiate a collection.

Figure 2B:
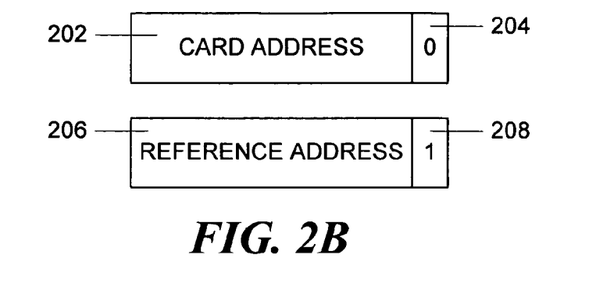
FIG. 2B is a block schematic diagram illustrating encoding of a reference cache entry with either a card address or a reference address.

In another embodiment, shown in FIG. 2B, each reference cache entry holds either a card address 202 or an actual reference address 206. Whether the entry holds a card address or a reference address is signified by manipulating the least significant bit. For example, the least significant bit 204 may be cleared for a card address and set, as indicated at 208, for a reference address. Other encoding schemes can obviously be used to distinguish card addresses from reference addresses.

Figure 2C:
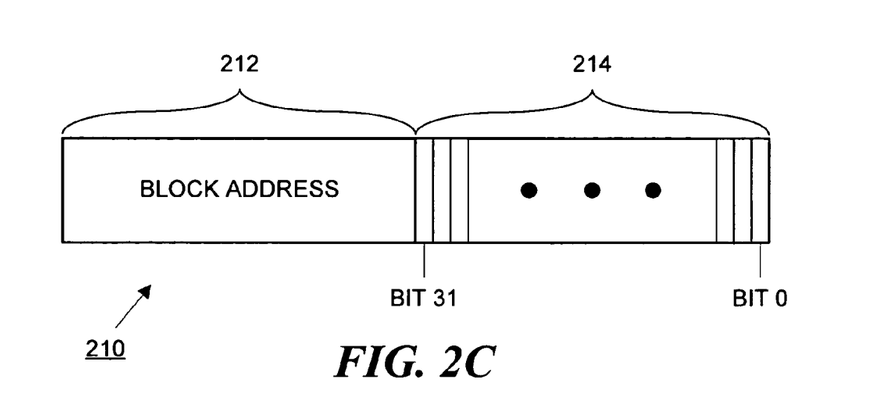
FIG. 2C is a block schematic diagram showing an illustrative arrangement for a reference cache entry for a computer system with a 32-bit address space.
Figure 2D:
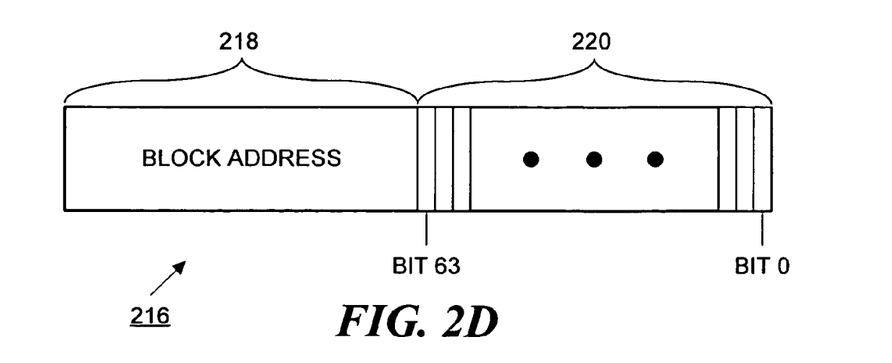
FIG. 2D is a block schematic diagram showing an illustrative arrangement for a reference cache entry for a computer system with a 64-bit address space.

FIG. 2C and FIG. 2D illustrate composite reference cache entries wherein each entry represents a small contiguous block of memory and comprises a block address which indicates the starting address of the memory block and a set of bits that indicate the modified status of references in the block. The size of a block is selected to take into account the size of reference values and the natural size of an integer on a given platform. Typical sizes of integers found on modern platforms are 8-bit, 16-bit, 32-bit, and 64-bit integers. The set of bits for each entry will be a multiple of one of these sizes. For purposes of the illustrated embodiment, single 32-bit or 64-bit integers are good choices. For example, FIGS. 2C and 2D illustrate sample reference cache entries for use in systems with 32-bit and 64-bit address spaces, respectively.

For example, the reference cache entry 210 shown in FIG. 2C is comprised of a block address 212, which is the address of the beginning of the block, and a bitmap section 214. Reference cache entry 210 assumes that the memory block size is 128 bytes and that reference locations are aligned to 32-bit word boundaries. Thus, each reference location has a minimum size of four bytes and, accordingly, at most 32 such locations could be resident in the 128-byte memory block. The 32 locations are each assigned a bit in the bitmap section 214 to indicate their modified status. This allows the status bits 214 to be indexed by simply masking bits in the reference address used to access the reference cache in order to extract bit sequences from the middle of the addresses.

In a similar manner, as shown in FIG. 2D, for a 64-bit address space, a memory block size of 512 bytes is chosen. Reference cache entry 216 also assumes that reference locations are aligned to 64-bit word boundaries. Thus, each reference location has a minimum size of eight bytes and, accordingly, at most 64 such locations could be resident in the 512-byte memory block. The 64 locations are each assigned a bit in the bitmap section 220 to indicate their modified status. It would be understood by those skilled in the art that the bitmaps shown in FIGS. 2C and 2D could be extended to allow for multiple words per reference cache entry.

Figure 2E:
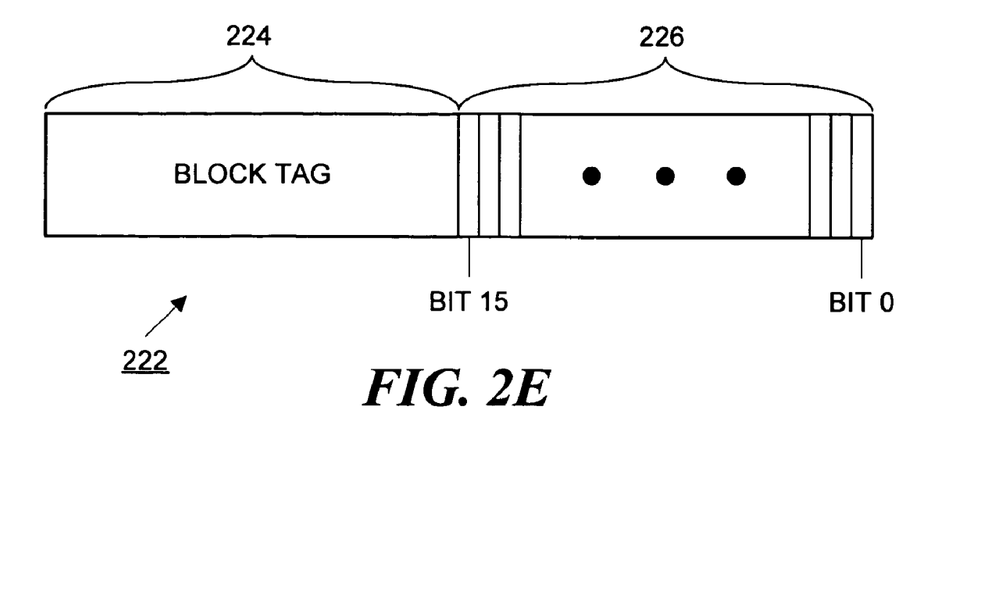
FIG. 2E is a block schematic diagram of a compressed bitmap representation for a reference cache entry obtained by combining the tag, index and bitmap.

The last encoding shown in FIG. 2E, called "compressed" bitmap encoding, differs from the other bitmap representations shown in FIGS. 2C and 2D by combining the bits used to index the entry in the reference cache. In particular, the entry 222 comprises a block tag section 224. The bitmap section 226 is comprised of 16 bits. This encoding is useful because combining the tag, an index derived from the address of the memory block and bitmap bits allows addresses to be reconstructed as needed. In other embodiments, other possible encodings are similar to inexact addresses, such as those described in "A Fast Write Barrier for Generational Garbage Collectors", U. Hölzle, OOPSLA '93 Garbage Collection Workshop, Washington, D.C. October 1993, wherein the address of an object is recorded together with a set of offsets or a bitmap encoding the location of modified references in that object. Using a reference-bitmap representation allows a thread to maintain information concerning reference locations that have been modified without representing the data as a single table or bitmap that is large enough to cover an entire generation or the heap.

When an application thread is started, the reference cache associated with that thread is initialized with all entries set to zero. Then, the write-barrier program code that is executed by that thread upon a store to a reference location simply determines the address to which a store is being attempted, masks off bits to index the reference cache, and checks the existing entry. If there is a match between the masked address and the address in the existing entry or the existing entry is zero, the entry information is updated with the current information. However, if there is no match, the existing entry is evicted and processed by the collector and the entry information is replaced by the current information.

Figure 3:
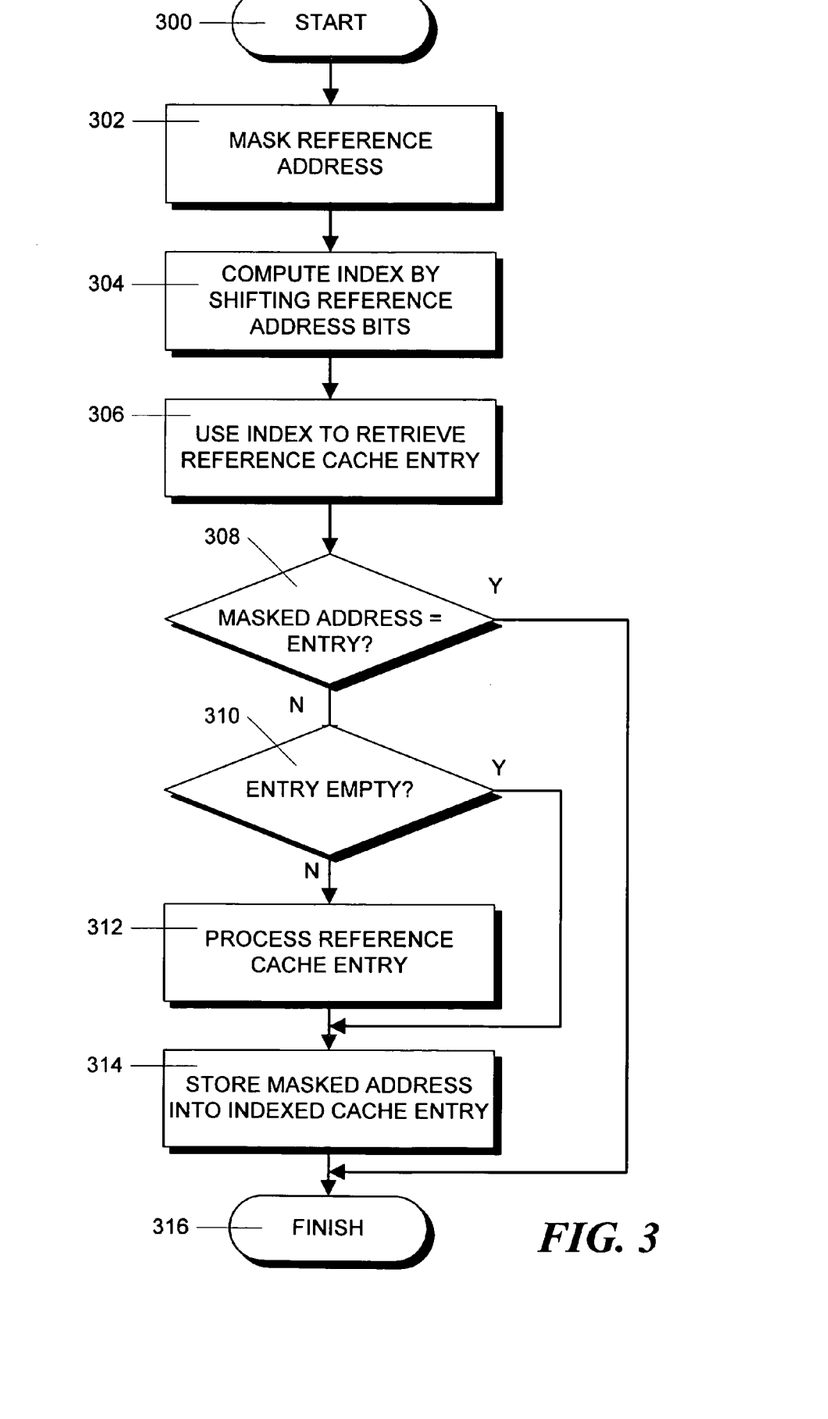
FIG. 3 is a flowchart showing the steps in an illustrative write barrier process for use with a reference cache that has card address entries.

The actual process performed by the write barrier code depends on the reference cache entry encoding. FIG. 3 illustrates a process that could be performed by sample write barrier code for use with a reference cache having entries that store card addresses. This process starts in step 300 and proceeds to step 302 where the reference address that triggered the write barrier is masked by ANDing it with an appropriate mask. Masking the reference address eliminates a requirement to clear the low-order bits and converts the reference address to the beginning address of the card on which the reference address is located.

Next, in step 304, an index into the reference cache is computed by shifting the masked address by an appropriate amount. Then, in step 306, the computed index is used to retrieve a reference cache entry. In step 308, a determination is made whether the masked address matches the address stored in the retrieved entry.

In particular, if the masked address is equal to the address stored in the entry, then the address has already been stored in the cache and the process finishes in step 316. Alternatively, if it is determined, in step 308, that the masked address does not equal the address stored in the entry, then, in step 310, a determination is made whether the entry is empty. If the entry is empty, no address has been previously stored there and, in that case, the entry can be updated by storing the masked address into the entry as set forth in step 314. The process then finishes in step 316.

However, if it is determined, in step 310, that the entry is not empty, then the entry must be processed to evict it as set forth in step 312. After the entry has been processed, the address in it can be overwritten with the new address as set forth in step 314 and the process finishes in step 316.

Figure 4:
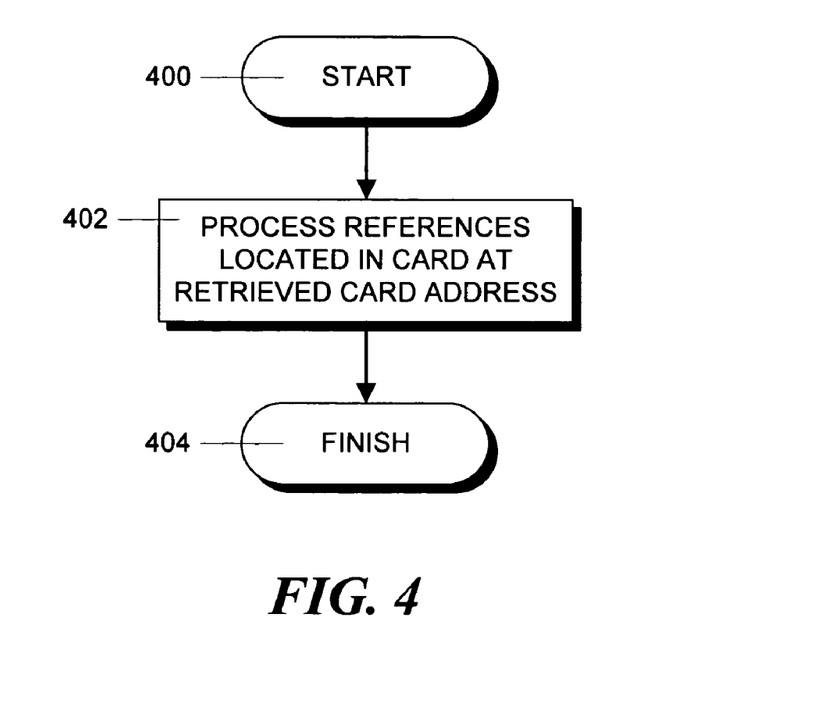
FIG. 4 is a flowchart showing steps in an illustrative routine that processes entries evicted from a reference cache that has card address entries.

FIG. 4 shows an illustrative process performed to process an evicted entry. This process starts in step 400 and proceeds to step 402, where the retrieved address is used in processing the entry as discussed above. The process then finishes in step 404. Note that when application threads are suspended by the collector in order to scavenge unused space, all unevicted entries in the reference caches of the application threads must also be processed. There are two different methods for processing these latter entries. In one embodiment, the collector can wait until all threads are suspended before the collector threads process the unevicted entries in the reference caches in the application threads. In still another embodiment, each application thread can process unevicted entries in its own reference cache as it suspends. The latter embodiment is attractive in part because it parallelizes well and because, when using signal-based suspension, it allows more threads to voluntarily suspend. Before the application threads are allowed to resume, all reference caches must be cleared so that all of their slots are empty.

Figure 5:
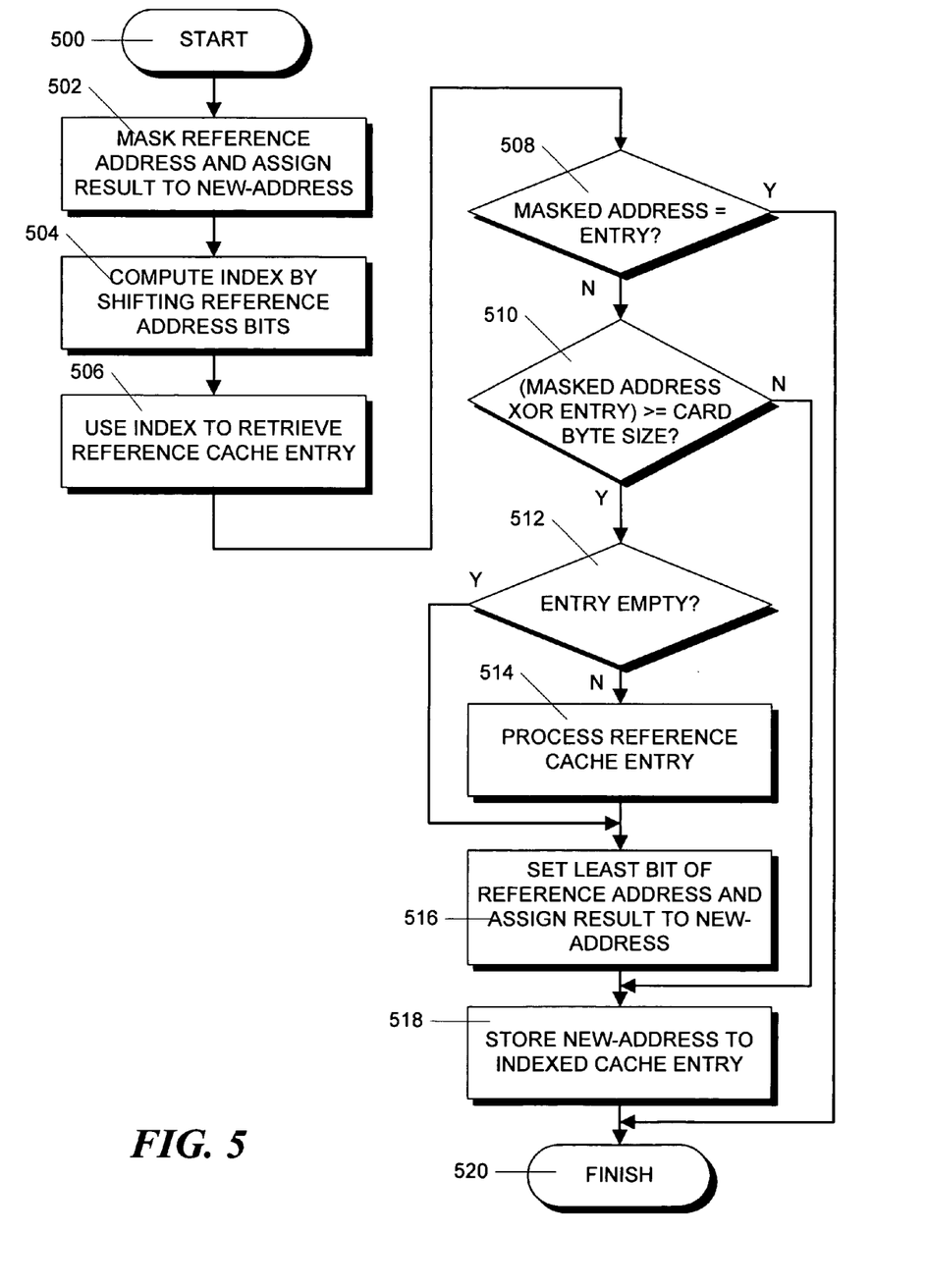
FIG. 5 is a flowchart showing the steps in an illustrative write barrier process for use with a reference cache that has card or reference address entries.

An illustrative process performed by write barrier code for use with a reference cache with card-reference encoding is shown in FIG. 5. This process begins in step 500 and proceeds to step 502 where the reference address that triggered the write barrier is masked by ANDing it with an appropriate mask. Masking the reference address eliminates a requirement to clear the low-order bits and converts the reference address to the beginning address of the card on which the reference address is located.

Next, in step 504, an index into the reference cache is computed by shifting the masked address by an appropriate amount. Then, in step 506, the computed index is used to retrieve a reference cache entry. In step 508, a determination is made whether the address to be recorded matches the address currently stored in the retrieved entry.

In particular, if the address to be recorded is equal to the address stored in the entry, then the address has already been stored in the cache and the process finishes in step 520. Alternatively, if it is determined, in step 508, that the address to be recorded does not equal the address stored in the entry, then, in step 510, a determination is made whether the address to be recorded and the currently stored address are associated with different cards. This determination is made by bitwise exclusive-ORing the address to be recorded with the current value in the cache entry and comparing the result to the card size. If the result of the bitwise exclusive-OR operation, treated as an unsigned integer, is less than the card size, the two addresses are associated with the same card. In this case, the entry can be updated by replacing the currently stored value with the new address as set forth in step 518. The process then finishes in step 520.

If, in step 510, it is determined that the two pieces of information are associated with different cards, then, in step 512, a determination is made whether the entry is empty. If the entry is empty, no address has been previously stored there and, in that case, the entry can be updated by marking the entry as containing a reference address (in this case by setting the least significant bit as set forth in step 516) and by storing the tagged reference address into the entry as set forth in step 518. The process then finishes in step 520.

However, if it is determined, in step 512, that the entry is not empty, then the entry must be processed to evict it as set forth in step 514. After the entry has been processed, it can be marked as containing a tagged reference address in step 516 and the address in it can be overwritten with the new address as set forth in step 518 and the process finishes in step 520.

Figure 6:
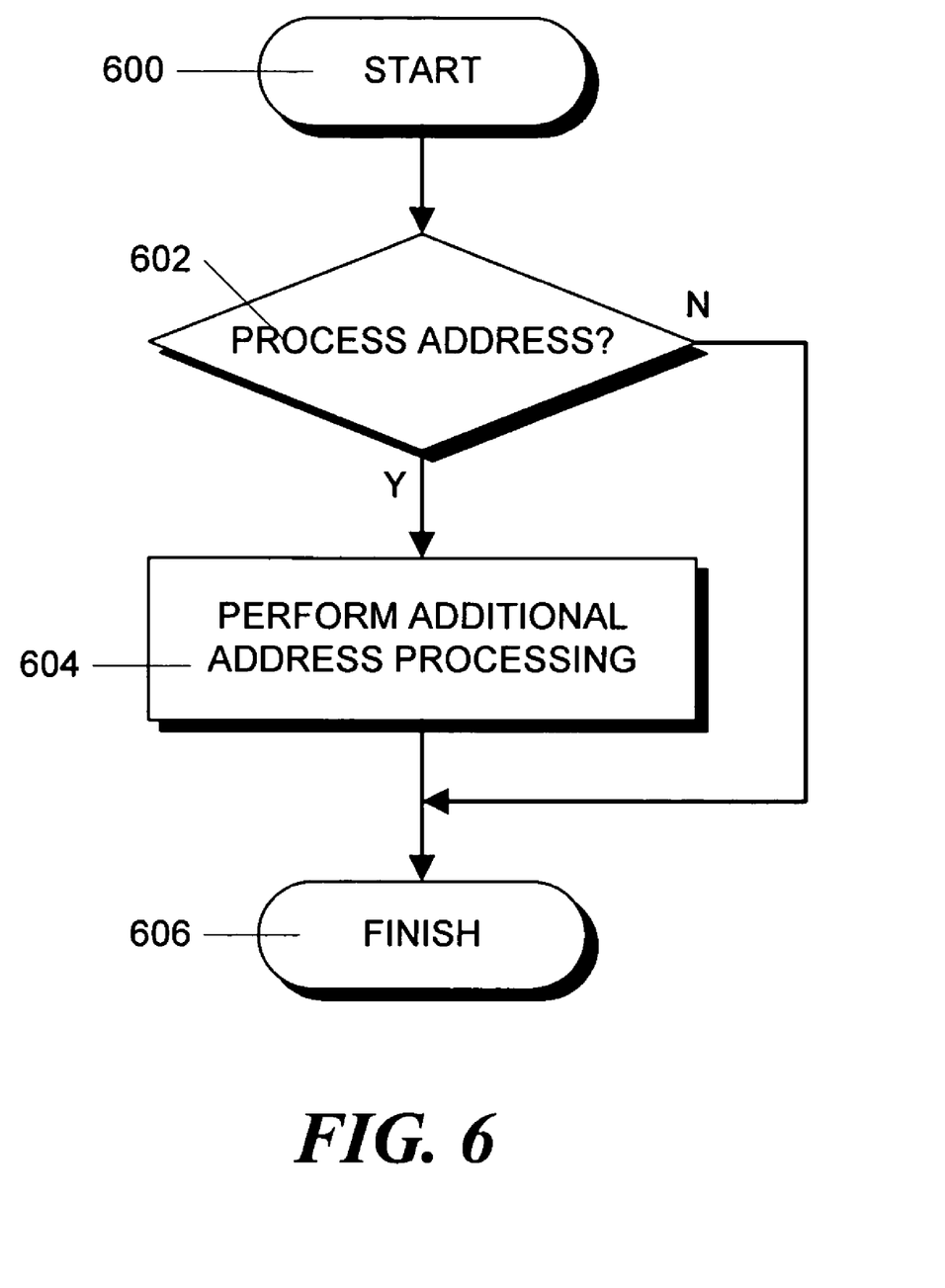
FIG. 6 is a flowchart showing steps in an illustrative routine that processes entries evicted from a reference cache that has card-reference address entries.

FIG. 6 shows an illustrative process performed to process an evicted entry when card-reference encoding is used. This process starts in step 600 and proceeds to step 602, where a determination is made whether the address must be processed. In this case, an entry must be processed if the least significant bit is cleared signifying that it is a card address. The status of the least significant bit can be determined by ANDing the address with a mask. Alternatively, if the address is not a card address and thus, is a reference address, this processing may take the form of performing summarization of the modified reference location for the collector and possibly triggering a collection pause, or recording the reference location in a sequential store buffer or other structure for subsequent processing. The process then finishes in step 606. If, in step 602, it is determined that the entry does not have to be processed, then the process simply finishes in step 606.

Figure 7:
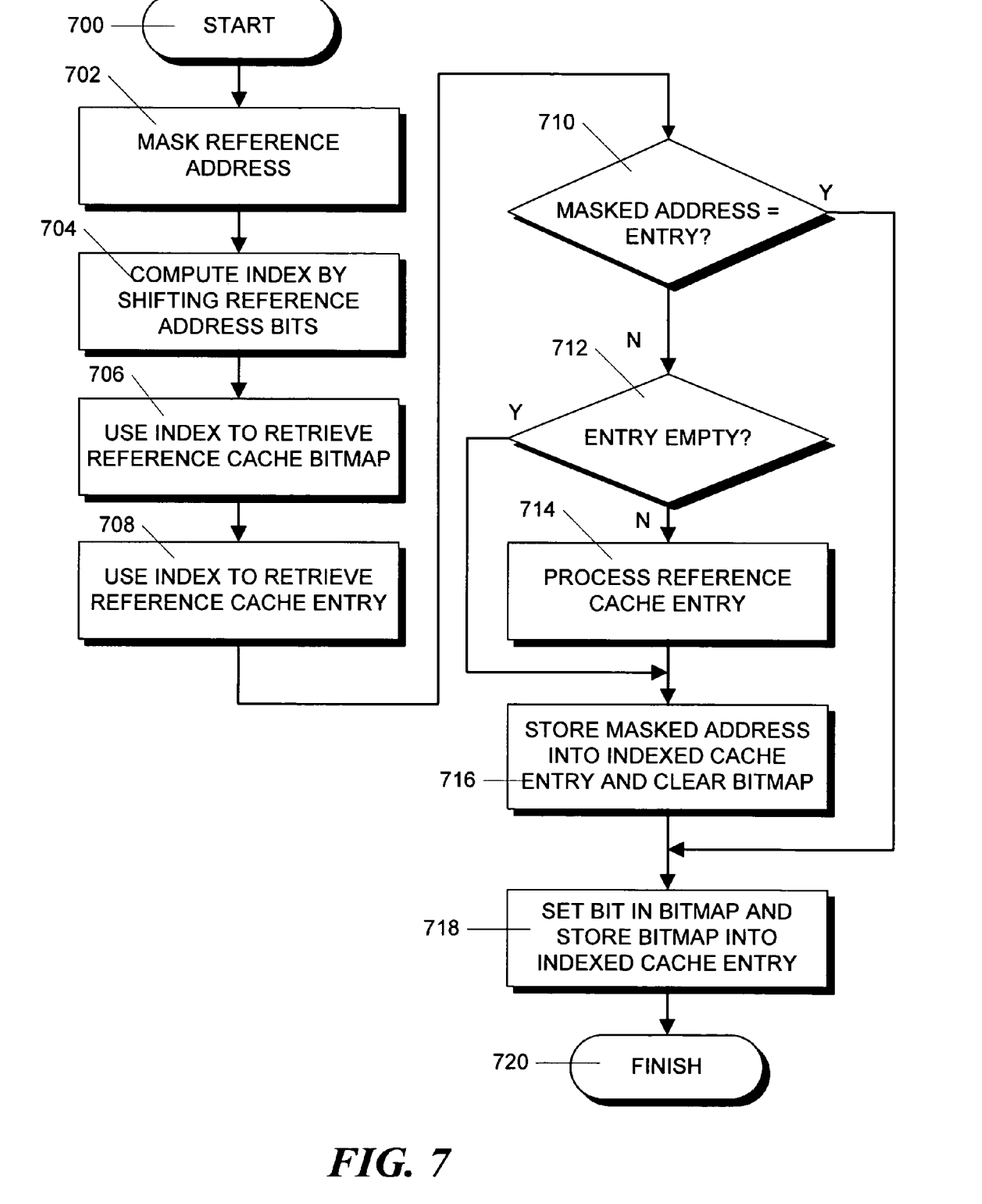
FIG. 7 is a flowchart showing the steps in an illustrative write barrier process for use with a reference cache that has address/bitmap entries.

An illustrative process performed by write barrier code for use with a reference cache with a block address/bitmap encoding is shown in FIG. 7. This process begins in step 700 and proceeds to step 702 where the reference address that triggered the write barrier is masked by ANDing it with an appropriate mask. Masking the reference address eliminates a requirement to clear the low-order bits and converts the reference address to the beginning address of the memory block on which the reference address is located.

Next, in step 704, an index into the reference cache is computed by shifting the masked address by an appropriate amount. Then, in step 706, the computed index is used to retrieve the bitmap portion of a reference cache entry. In step 708, the computed index is used to retrieve the block address portion of a reference cache entry. For example, the bitmap and block address may be stored in consecutive slots in the reference cache so that the index is simply incremented by one after the bitmap has been retrieved in order to retrieve the block address stored in the next slot. In step 710, a determination is made whether the masked address matches the block address stored in the retrieved entry.

In particular, if the masked address is equal to the block address stored in the entry, then information relating to the reference address has already been stored in the cache and the process proceeds to step 718 where the bitmap is updated. The bitmap can be updated by shifting a "one" to the proper bitmap location to produce a mask and ORing the mask with the current bitmap. The bitmap is then stored in the indexed reference cache entry. The process finishes in step 720.

Alternatively, if it is determined, in step 710, that the masked address does not equal the address stored in the entry, then, in step 712, a determination is made whether the entry is empty. If the entry is empty, no address has been previously stored there and, in that case, the entry can be updated by storing the masked address into the entry as set forth in step 716 and clearing the bitmap. The bitmap can be updated by shifting a "one" to the proper bitmap location to produce a mask and ORing the mask with the current bitmap. The bitmap is then stored in the indexed reference cache entry. The process finishes in step 720.

However, if it is determined, in step 712, that the entry is not empty, then the entry must be processed to evict it as set forth in step 714. After the entry has been processed, the reference cache is updated in steps 716 and 718 as described above. The process then finishes in step 720.

Figure 8:
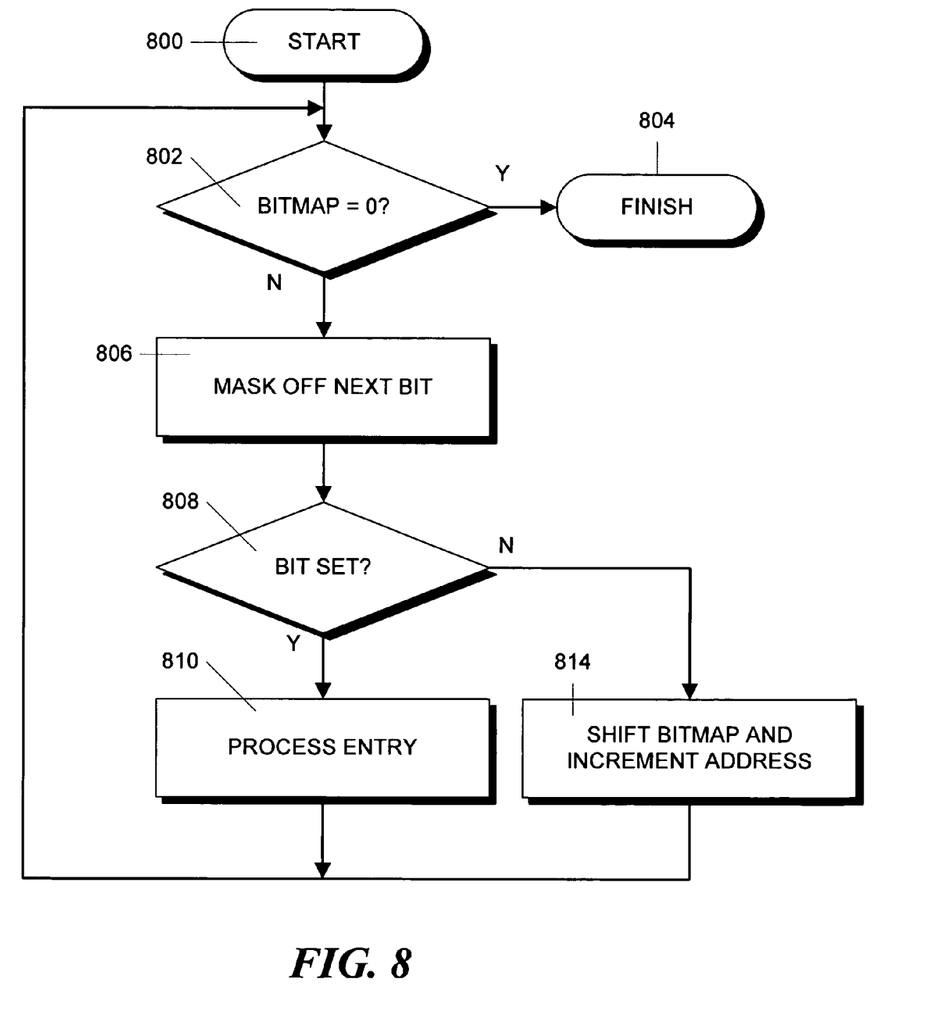
FIG. 8 is a flowchart showing steps in an illustrative routine that processes entries evicted from a reference cache that has address/bitmap entries.

FIG. 8 shows an illustrative process performed to process an evicted entry when block address-bitmap encoding is used. This process starts in step 800 and proceeds to step 802, where a determination is made whether the bitmap has been completely processed (contains all zeroes). If the bitmap has been completely processed, the process finishes in step 804. Alternatively, if further processing remains, the process proceeds to step 806 where the next bit to be processed is masked off.

In step 808, a determination is made whether the latter bit has been set indicating that the corresponding address has been modified. If the bit is not set, indicating that the corresponding address has not been modified (the entry value is used as the starting address), then the process proceeds to step 814 where the bitmap is shifted to move the next bit into position for processing (and move a zero into the leftmost bit) and the address to be examined is incremented. The process then proceeds back to step 802 to determine whether further processing is necessary.

If, in step 808, it was determined that the bit under examination was set, indicating that the corresponding address was modified, and, thus, needs to be processed, then, in step 810, the entry can be processed as described above. This additional processing can involve logging the reference-bitmap encoding in a sequential store buffer or using the application thread that evicts the entry to scan and summarize the reference locations identified by the entry as having been modified. The advantage here is that only locations known to have been modified are examined. The process then proceeds back to step 802 to determine if further processing must be performed.

Alternatively, if in step 810, it is determined that the address is not of interest, then in step 814, the bitmap is shifted and the address under consideration incremented. Operation continues in this manner until all bits in the bitmap have been processed.

Figure 9:
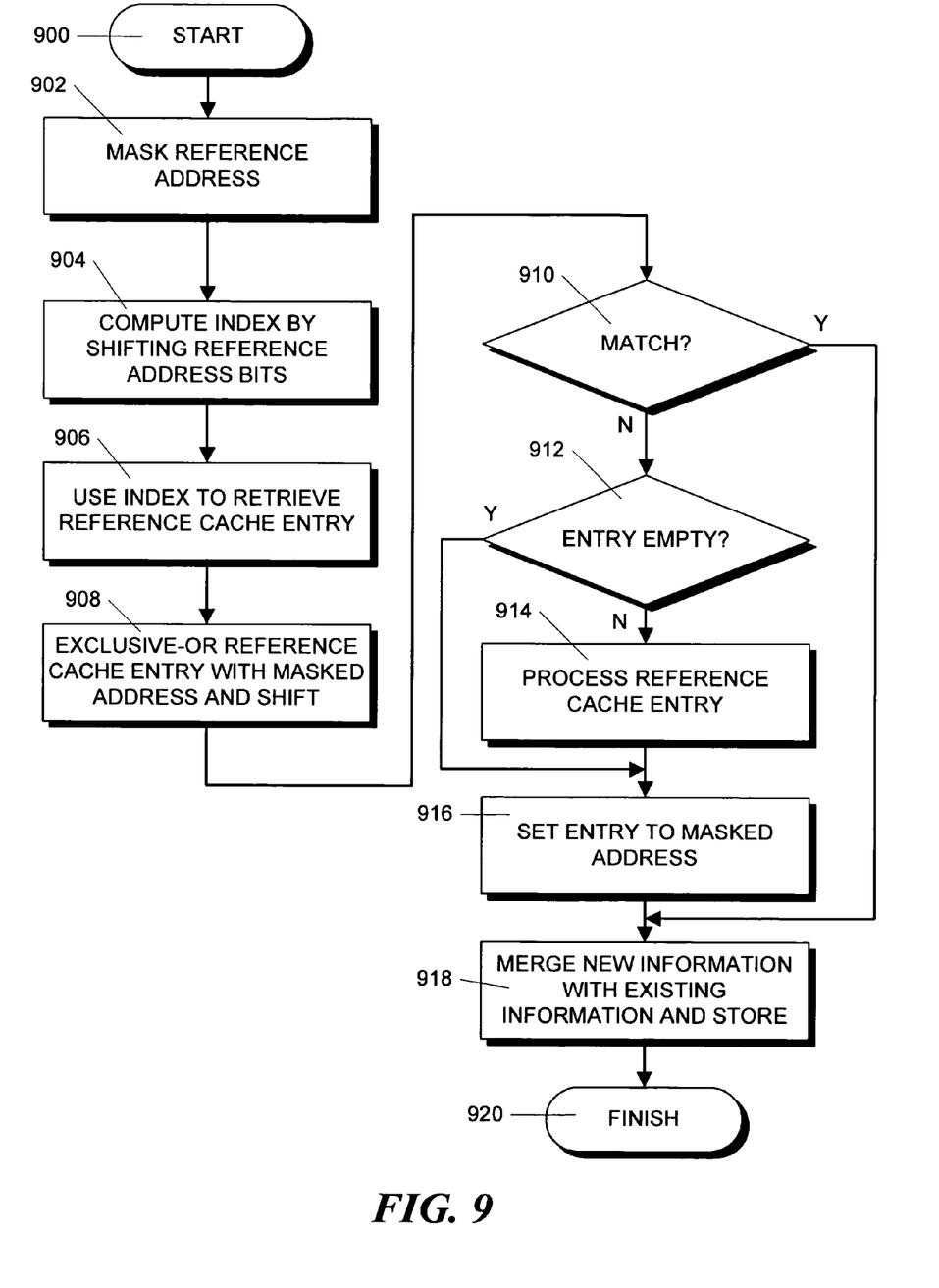
FIG. 9 is a flowchart showing the steps in an illustrative write barrier process for use with a reference cache that has compressed address/bitmap entries.

An illustrative process performed by write barrier code for use with a reference cache with a compressed block address/bitmap encoding is shown in FIG. 9. This process begins in step 900 and proceeds to step 902 where the reference address that triggered the write barrier is masked by ANDing it with an appropriate mask. The mask chosen takes into account the fact that the index of the entry in the reference cache is identical to a sequence of the bits taken from the middle of the reference address. Masking the reference address eliminates a requirement to clear the low-order bits and converts the address to an address tag that combined with the index of the entry, appropriately shifted, results in the beginning address of the memory block on which the reference address is located.

Next, in step 904, an index into the reference cache is computed by shifting the masked address by an appropriate amount. Then, in step 906, the computed index is used to retrieve the reference cache entry (which includes the block tag and bitmap). In step 908, the reference cache entry is processed to determine whether the memory block in the entry contains the reference location being recorded. This can be determined by bitwise-exclusive-ORing the address to be recorded with the retrieved value and then shifting the result by a predetermined amount. The predetermined amount is equal to the number of bits devoted to the bitmap in the compressed bitmap entry. This combination of a bitwise exclusive-OR and shift operation allows the embodiment to compare the address tags and will result in a value of 0 if the recorded memory block contains the reference address being recorded. In step 910, a determination is made whether there is a match indicating that the memory block does contain the reference location being recorded.

In particular, if there is a match, then the process proceeds to step 918 where the information to be recorded is simply merged with the existing information at the indexed reference cache location and stored. The process then finishes in step 920.

Alternatively, if it is determined, in step 910, that there is no match, then, in step 912, a determination is made whether the entry is empty. If the entry is empty, no address has been previously stored there and, in that case, the entry can be updated by setting the entry to the new address in step 916 and then merging the information to be recorded into the entry and storing the entry back into the indexed reference cache location as set forth in step 918. The process finishes in step 920.

However, if it is determined, in step 912, that there is no match and the entry is not empty, then information for another reference location has been recorded at the indexed location and the entry must be processed to evict it as set forth in step 914. After the entry has been processed, the reference cache is updated with the new information to be recorded as set forth in steps 916 and 918 as described above. The process then finishes in step 920.

Figure 10:
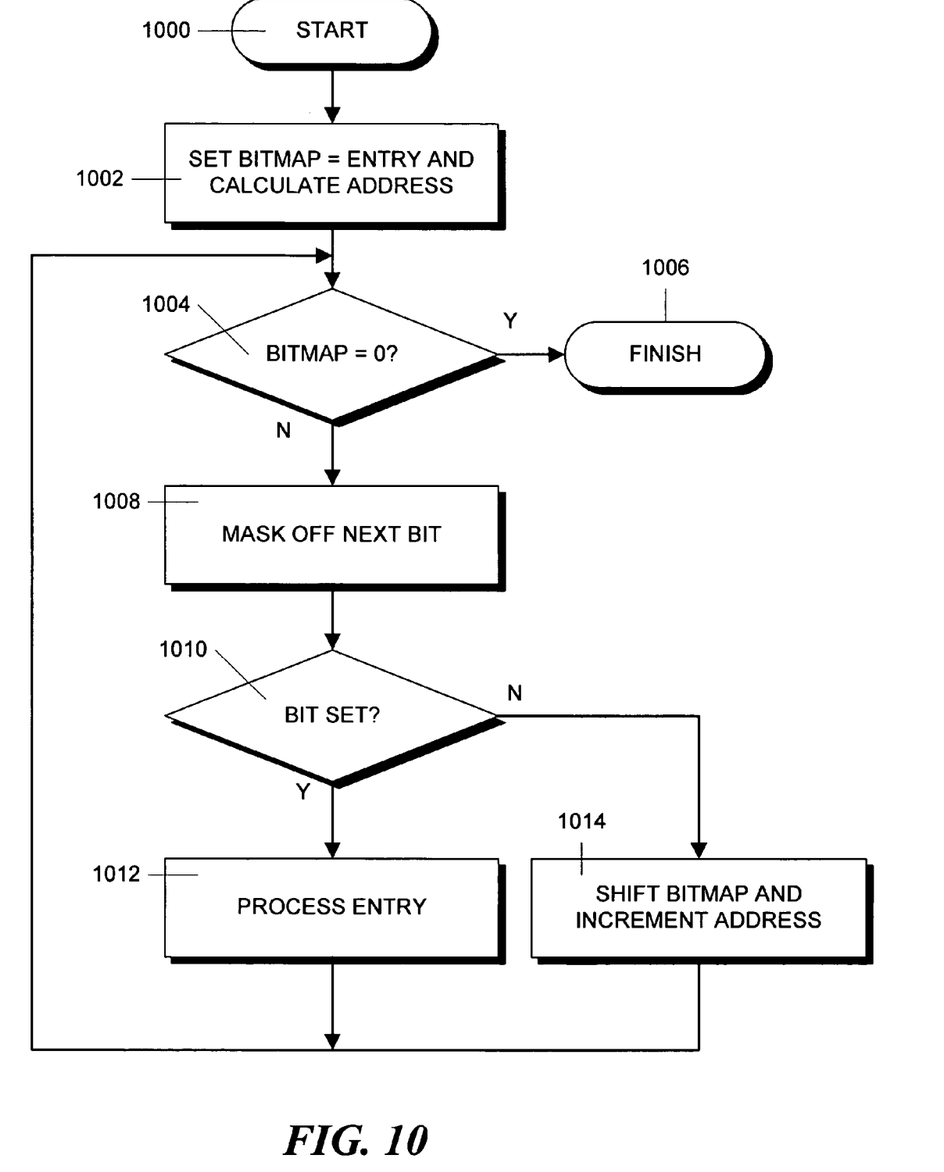
FIG. 10 is a flowchart showing steps in an illustrative routine that processes entries evicted from a reference cache that has compressed address/bitmap entries.

FIG. 10 shows an illustrative process performed to process an evicted entry when compressed block address-bitmap encoding is used. This process starts in step 1000 and proceeds to step 1002, where the bitmap is set equal to the value of the reference cache entry and the beginning address of the memory block represented by the entry is calculated. This latter calculation involves masking the entry to obtain the block tag and ORing the block tag with a shifted value of the index used in the write barrier process shown in FIG. 9 to obtain the beginning address of the memory block.

In step 1004, a determination is made whether the bitmap has been completely processed (contains all zeroes). If the bitmap has been completely processed, the process finishes in step 1006. Alternatively, if further processing remains, the process proceeds to step 1008 where the next bit to be processed is masked off.

In step 1010, a determination is made whether the latter bit has been set indicating that the corresponding address has been modified. If the bit is not set, indicating that the corresponding address has not been modified, then the process proceeds to step 1014 where the bitmap is shifted to move the next bit into position for processing (and move a zero into the leftmost bit) and the address to be examined is incremented. The process then proceeds back to step 1004 to determine whether further processing is necessary.

If, in step 1010, it was determined that the bit under examination was set, indicating that the corresponding address was modified, and, thus, needs to be processed, then, in step 1012, the entry is processed as discussed above, for example by logging the reference-bitmap encoding in a sequential store buffer or by using the application thread that evicts the entry to scan and summarize the reference locations identified by the entry as having been modified. The process then proceeds back to step 1004 to determine if further processing must be performed. Operation continues in this manner until all bits in the bitmap have been processed.

One advantage of conventional card-marking is the simplicity of its code, which is often placed inline. On most architectures, only two or three additional card marking instructions must be executed for each reference store operation and these instructions typically schedule well. However, in the case of the inventive write-barrier techniques described above, an index into the thread structure must be calculated and a sequence of loads, comparisons, and stores performed. On rare occasions, calls must be made to process modified reference locations. For example, on SPARC™ processors, developed and sold by Sun Microsystems, Inc. the write barrier code requires 8, 10, or 16 instructions in the fast path of the card, card-reference, and address/bitmap write-barriers in addition to a call to the collector to process evicted entries.

Consequently, common precautions can be taken to minimize the delay produced by the additional calculations. For example, assuming that the reference cache is implemented inline with the thread structure, as discussed above, due to the frequent need to access the thread structure to obtain reference cache entries, it is helpful that a reference to the thread structure be kept available in a register. It is also helpful to memorize the address of the start of the reference cache in a register as this is passed to the write barrier function. In addition, conventional checks to guard against unnecessary recordings of writes can also be performed. These checks can include whether the contents written are zero, whether the contents and the reference location are sufficiently close together and whether the reference location is in a generation that makes use of write-barriers. Other techniques, such as deferring the recording of reference modifications to, and across, safe-points would also combine well with inventive techniques without the cost of extra instructions.

A software implementation of the above-described embodiment may comprise a series of computer instructions on a tangible medium, such as a computer readable media, for example, a diskette, a CD-ROM, a ROM memory, or a fixed disk. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology. It is contemplated that such a computer program product may be distributed as a removable media with accompanying printed or electronic documentation, e.g., shrink wrapped software, pre-loaded with a computer system, e.g., on a system ROM or fixed disk.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different write barrier code implementations other than that specifically described could be used. In addition, although the described embodiments of evicted entry processing use card marking to insure that changed entries are scanned during a subsequent garbage collection process, other techniques for insuring that modified references are scanned could also be used. For example, page marking or another similar technique could also be used. The order of the process steps may also be changed without affecting the operation of the invention. Other aspects, such as the specific process flow, as well as other modifications to the inventive concept are intended to be covered by the appended claims.

What is claimed is:

1. A method for performing garbage collection, comprising:
   obtaining a memory heap partitioned into a plurality of blocks;
   obtaining a reference cache comprising an entry;
   modifying a reference stored at a first location in the memory heap;
   mapping the first location to the entry and storing the first location in the entry;
   modifying a reference stored at a second location in the memory heap;
   mapping the second location to the entry after storing the first location in the entry;
   comparing the entry with a block corresponding to the second location to generate a comparison result;
   evicting the first location from the entry based on the comparison result, wherein the first location and the second location are associated with different blocks of the plurality of blocks;
   storing the second location in the entry after evicting the first location;
   scanning and summarizing at least the first location after evicting the first location;
   reclaiming at least one bit of memory in the memory heap for reuse based on the scanning and summarizing of at least the first location;
   modifying a reference stored at a third location in the memory heap;
   mapping the third location to the entry after storing the second location to the entry;
   performing a second comparison between the block address corresponding to the second location and a block address corresponding to the third location after mapping the third location to the entry; and
   storing the third location with the second location in the entry based on the second comparison wherein the second location and the third location are associated with the same block of the plurality of blocks,
   wherein evicting the first location from the entry and scanning and summarizing at least the first location is executed by an application thread, and
   wherein the reference cache is embedded in the application thread.

2. The method of claim 1, wherein the entry comprises a block address of the block corresponding to second location and a plurality of offset bits identifying the second location and the third location.

3. The method of claim 1, further comprising:
   storing a block address of a block corresponding to the first location in the entry before mapping the second location to the entry; and
   replacing the block address of the block corresponding to the first location with a block address of the block corresponding to the second location in the entry after evicting the first location from the entry.

4. The method of claim 1, wherein mapping the first location to the entry comprises:
   masking an address of the first location to generate a masked address; and
   shifting the masked address to calculate an index identifying the entry.

5. The method of claim 1, wherein storing the first location in the entry comprises:
   setting an offset bit corresponding to the first location in the entry.

6. The method of claim 1, further comprising:
   scanning and summarizing the second location and the third location.

7. The method of claim 6, further comprising:
   suspending the application thread after evicting the first location, wherein scanning and summarizing the second location and the third location are executed by the application thread as the application thread suspends.

8. The method of claim 6, wherein scanning and summarizing the second location and the third location are executed by at least one garbage collector thread.

9. A method for performing garbage collection, comprising:
   obtaining a memory heap divided into a plurality of cards;
   obtaining a card table comprising a plurality of card table entries for the plurality of cards;
   obtaining a reference cache comprising an entry;
   modifying a reference stored at a first location in the memory heap;
   identifying a first card corresponding to the first location;
   mapping the first card to the entry and storing an address of the first card in the entry;
   modifying a reference stored at a second location in the memory heap;
   identifying a second card corresponding to the second location;
   mapping the second card to the entry after storing the address of the first card;
   comparing an address of the second card with the entry to generate a comparison result,
   evicting the address of the first card from the entry based on the comparison result, wherein the first location and the second location are associated with different cards in the plurality of cards;
   storing the address of the second card in the entry after evicting the address of the first card;
   scanning objects in the heap overlapping the first card after evicting the address of the first card; reclaiming at least one bit of memory in the memory heap for reuse based on at least the scanning;
   modifying a reference stored at a third location in the memory heap;
   identifying a third card corresponding to the third location;
   mapping the third card to the entry after storing the address of the second card;
   performing a second comparison between the address of the second card and an address of the third card, after mapping the third location to the entry; and
   storing the address of the third card in the entry with the address of the second card based on the second comparison, wherein the second location and the third location are associated with the same cards of the plurality of cards,
   wherein evicting the address of the first card from the entry and scanning objects in the heap overlapping the first card is executed by an application thread, and
   wherein the reference cache is embedded in the application thread.

10. The method of claim 9, further comprising:
    marking a card table entry corresponding to the first card after evicting the address of the first card from the entry and before scanning objects in the heap.

11. The method of claim 9, wherein mapping the first card comprises:
  masking the address of the first card to generate a masked address; and
  shifting the masked address to calculate an index identifying the entry.

12. The method of claim 9, further comprising:
  scanning objects in the heap overlapping the second card after evicting the address of the first card.

13. The method of claim 12, wherein scanning objects in the heap overlapping the second card is executed by a garbage collector thread.

14. The method of claim 12, further comprising:
  suspending the application thread, wherein scanning objects in the heap overlapping the second card is executed by the application thread as the application thread suspends.

15. A computer readable medium storing instructions for performing garbage collection, the instructions comprising functionality to:
  obtain a memory heap partitioned into a plurality of blocks;
  obtain a reference cache comprising an entry;
  modify a reference stored at a first location in the memory heap;
  map the first location to the entry and store the first location in the entry;
  modify a reference stored at a second location in the memory heap;
  map the second location to the entry after storing the first location in the entry;
  compare the entry with a block corresponding to the second location to generate a comparison result;
  evict the first location from the entry based on the comparison result, wherein the first location and the second location are associated with different blocks of the plurality of blocks;
  store the second location in the entry after evicting the first location;
  scan and summarize at least the first location after evicting the first location; reclaim at least one bit of memory in the memory heap for reuse based on the scanning and summarizing of at least the first location;
  modify a reference stored at a third location in the memory heap;
  map the third location to the entry after storing the second location to the entry;
  perform a second comparison between the block address corresponding to the second location and a block address corresponding to the third location, after mapping the third location to the entry; and
  store the third location with the second location in the entry based on the second comparison, wherein the second location and the third location are associated with the same block of the plurality of blocks,
  wherein evicting the first location from the entry and scanning and summarizing at least the first location is performed using an application thread, and
  wherein the reference cache is embedded in the application thread.

16. The computer readable medium of claim 15, wherein the entry comprises a block address of the block corresponding to second location and a plurality of offset bits identifying the second location and the third location.

17. The computer readable medium of claim 15, the instructions further comprising functionality to:
  store a block address of a block corresponding to the first location in the entry before mapping the second location to the entry; and
  replace the block address of the block corresponding to the first location with a block address of the block corresponding to the second location in the entry after evicting the first location from the entry.

18. The computer readable medium of claim 15, the instructions further comprising functionality to:
  scan and summarize the second location and the third location.

19. The computer readable of claim 18, wherein the instructions to scan and summarize the second location and the third location are executed by at least one garbage collector thread.

20. The computer readable medium of claim 18, the instructions further comprising functionality to:
  suspend the application thread after evicting the first location, wherein scanning and summarizing the second location and the third location are executed by the application thread as the application thread suspends.

21. An apparatus for performing garbage collection, comprising:
  means for obtaining a memory heap partitioned into a plurality of blocks;
  means for obtaining a reference cache comprising an entry;
  means for modifying a reference stored at a first location in the memory heap;
  means for mapping the first location to the entry and storing the first location in the entry;
  means for modifying a reference stored at a second location in the memory heap;
  means for mapping the second location to the entry after storing the first location in the entry;
  means for comparing the entry with a block corresponding to the second location to generate a comparison result;
  means for evicting the first location from the entry based on the comparison result, wherein the first location and the second location are associated with different blocks of the plurality of blocks;
  means for storing the second location in the entry after evicting the first location;
  means for scanning and summarizing at least the first location after evicting the first location;
  means for reclaiming at least one bit of memory in the memory heap for reuse based on the scanning and summarizing of at least the first location;
  means for modifying a reference stored at a third location in the memory heap;
  means for mapping the third location to the entry after storing the second location to the entry;
  means for performing a second comparison between the block address corresponding to the second location and a block address corresponding to the third location after mapping the third location to the entry; and
  means for storing the third location with the second location in the entry based on the second comparison, wherein the second location and the third location are associated with the same block of the plurality of blocks,
  wherein evicting the first location from the entry and scanning and summarizing at least the first location is executed by an application thread, and wherein the reference cache is embedded in the application thread.

22. The apparatus of claim 21, further comprising:

means for storing a block address of a block corresponding to the first location in the entry before mapping the second location to the entry; and means for replacing the block address of the block corresponding to the first location with a block address of the block corresponding to the second location in the entry after evicting the first location from the entry.

\* \* \* \* \*